United States Patent
Venkataraman (10) Patent No.: US 12,532,146 B2
(45) Date of Patent: Jan. 20, 2026

(54) SYSTEM AND METHOD FOR MANAGING LOCATION INFORMATION OF A MOBILE DEVICE

(71) Applicant: Rakuten Symphony, Inc., Tokyo (JP)

(72) Inventor: Viswanathan Venkataraman, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 370 days.

(21) Appl. No.: 18/127,925

(22) Filed: Mar. 29, 2023

(65) Prior Publication Data
US 2024/0334158 A1    Oct. 3, 2024

(51) Int. Cl.
    *H04W 4/029*    (2018.01)
(52) U.S. Cl.
    CPC ..................... *H04W 4/029* (2018.02)
(58) Field of Classification Search
    None
    See application file for complete search history.

(56) References Cited

U.S. PATENT DOCUMENTS

| | | | | |
|---|---|---|---|---|
| 2002/0007411 A1* | 1/2002 | Shaked | ............... | H04L 63/1441 709/229 |
| 2015/0038130 A1* | 2/2015 | Mao | ................... | H04M 1/72409 455/418 |
| 2022/0190886 A1* | 6/2022 | Islam | ................... | H04W 72/044 |
| 2022/0345887 A1* | 10/2022 | Karampatsis | ........... | H04L 67/53 |

FOREIGN PATENT DOCUMENTS

| | | | | |
|---|---|---|---|---|
| CN | 108604449 A | * | 9/2018 | ............. G10L 15/22 |
| EP | 2713632 A1 | * | 4/2014 | ........... H04L 67/303 |
| KR | 101416275 B1 | * | 7/2014 | |

* cited by examiner

*Primary Examiner* — Adolf Dsouza
(74) *Attorney, Agent, or Firm* — Sughrue Mion, PLLC (57) ABSTRACT

Provided are system, method, and device for managing network device provisioning. The system may include: a memory storage storing computer-executable instructions; and at least one processor communicatively coupled to the memory storage, and the at least one processor may be configured to execute the instructions to: obtain at least one configuration profile; determine, based on the at least one configuration profile, at least one target mobile device; and perform an action for managing location information of the at least one target mobile device.

14 Claims, 6 Drawing Sheets

| ID | Device Information | Schedule | Previous Trigger | Location Information |
|---|---|---|---|---|
| 1 | - MSISDN: Values 1<br>- IMSI: Values 2 | - LBS 1: Every 5 mins<br>- LBS 2: Every 30 mins | - Date: 202X-X-Y<br>- Time: AA:BB | - Coordinate: (X1, Y1)<br>- Last Updated on Date 1, Time 1 |
| 2 | - MSISDN: Values 3<br>- IMSI: Values 4 | - LBS 3: Every 1 h<br>- Other LBS: Every 30s | - Date: 202X-X-Y<br>- Time: AA:-- | - Coordinate: (X2, Y2)<br>- Last Updated on Date 2, Time 2 |
| 3 | - MSISDN: Values 5<br>- IMSI: Values 6 | - Every 30 s | - Date: 202X-X-Y<br>- Time: AA:BB:CC | - Coordinate: (X3, Y3)<br>- Last Updated on Date 3, Time 3 |
| ... | ... | ... | ... | ... |
| N | - Information N1 | - Configuration N | - Information N2 | - Information N3 |

SYSTEM AND METHOD FOR MANAGING LOCATION INFORMATION OF A MOBILE DEVICE

TECHNICAL FIELD

Systems, methods, and devices consistent with example embodiments of the present disclosure relate to telecommunication systems, and more specifically, relate to managing location information of at least one mobile device in at least one telecommunication system.

BACKGROUND

Location information of a mobile device may be utilized for various types of location-based services (LBS), such as: (1) emergency-related LBS like providing a location-based alert (e.g., disaster, extreme weather, etc.), provision of location information of a user of a mobile device (may be referred to as "the user" herein) who make an emergency call, and the like; (2) commercial-related LBS like provision of location-based marketing campaign, provision of navigation information, tracking of missing device, anti-theft and fraud prevention, region-exclusive gaming, and the like; (3) lawful intercept LBS like provision of location information to support legally required or sanctioned services, and the like. Nevertheless, there are several shortcomings in the related-art approaches for managing location information of the mobile device for LBS, as described in the following.

Specifically, in the related art, global positioning system (GPS) technologies are commonly utilized in LBS provision, since they are user-friendly for the user, and are easier to be implemented by the LBS providers (may be referred to as "service providers" herein). However, utilization of GPS may be limited and suboptimal. For instance, the GPS may have poor indoor-signal and may not be able to provide accurate location information when the mobile device is in an indoor area (e.g., in a building, etc.). As a result, the location information obtained by the GPS is not always accurate and is not always feasible. Further, internet connection and installation of a third-party software application may be required in order to utilize the location information obtained from the GPS for providing LBS, which may lead to instability in provision of LBS, may increase the power consumption of the mobile device, and may introduce potential security and privacy risks.

In the related art, in order to obtain location information (via GPS or other suitable technologies) for utilizing a LBS, the user is usually required to first obtain and install a software application (developed, released, and/or operated by an associated service provider) on the mobile device. The software application being installed in the mobile device may include a client application which may communicate with a server application deployed in a system of the service provider (may be referred to as "LBS system" herein) for utilizing the LBS.

For instance, whenever the LBS is required, the client application installed in the mobile device may obtain the location information, and/or the server application in the LBS system may send a request to the client application (e.g., via Application Programming Interface (API) calls, etc.) to obtain the location information. Accordingly, the client application may transmit the location information to the server application. The server application may then retrieve the LBS and/or the associated information based on the location information and provide the same to the client application.

In this regard, internet connection is required in order to facilitate the communication between the client application and the server application. Namely, when the mobile device has no internet connection or has weak internet connection, the communication between the client application and the server application may be impacted (e.g., the server application may not be able to transmit the request for obtaining the location information and/or the LBS to the client application, the client application may not be able to transmit the location information to the server application, etc.), and accordingly the LBS will not be able to be timely provided to the user. By way of example, a user may want to obtain available offer(s)/campaign(s) information in a shopping mall via an associated client application installed in his mobile device, but his mobile device has no internet connection (e.g., due to exceed data usage, due to weak network connection, etc.), and thus the client application may not be able to timely provide the required information to the LBS system, and vice versa.

Further, in order to utilize a LBS which requires continuous (or periodic) location information of the mobile device, the client application and/or the server applications may continuously (or periodically) trigger the mobile device to obtain the location information of the mobile device. For instance, the client application and the GPS module in the mobile device may be configured to continuously (or periodically) turn on or to operate in background, so as to continuously (or periodically) obtain the location information of the mobile device and to continuously (or periodically) provide the same to the server application. This, however, may increase the power consumption of the mobile device, and the client application and/or the GPS module may be turned off (e.g., automatically turned off by the mobile device, manually turned off by the user, etc.) under certain situations (e.g., low battery, overheating, etc.). In that case, the mobile device may not be able to utilize the LBS since the location information of the mobile device cannot be obtained and/or since the client application is turned off.

Furthermore, since the client application associated with the LBS is installed on the mobile device, the client application may have direct access to sensitive information such as location information as well as the mobile device information. For example, the client application may obtain and provide information which may identify which mobile device is at which location at which time. This may introduce potential security and privacy risks, particularly when the service provider is an untrusted entity, the client application installed on the mobile device is a malicious application or an application released by a fake service provider, or the like.

SUMMARY

Example embodiments of the present disclosure provides a system, a method, and a device to automatically manage location information of one or more mobile devices, without requiring the one or more mobile devices to have internet connection, without requiring a third-party application and/or a GPS module in the one or more devices to be turned-on, and without requiring the service provider to access the one or more mobile devices. Ultimately, example embodiments of the present disclosures manage the location information of the one or more mobile devices in a more efficient, more consistent, and more secure manner.

According to embodiments, a system is provided. The system may include: a memory storage storing computer-executable instructions; and at least one processor communicatively coupled to the memory storage, wherein the at least one processor may be configured to execute the instructions to: obtain at least one configuration profile; determine, based on the at least one configuration profile, at least one target mobile device; and perform an action for managing location information of the at least one target mobile device.

According to embodiments, a method is provided. The method may be performed by at least one processor, and may include: obtaining at least one configuration profile; determining, based on the at least one configuration profile, at least one target mobile device; and performing an action for managing location information of the at least one target mobile device.

According to embodiments, a non-transitory computer-readable recording medium is provided. The non-transitory computer-readable recording medium may have recorded thereon instructions executable by at least one processor to cause the at least one processor to perform a method including: obtaining at least one configuration profile; determining, based on the at least one configuration profile, at least one target mobile device; and performing an action for managing location information of the at least one target mobile device.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without being limited to specific software code. It is understood that software and hardware may be designed to implement the systems and/or methods based on the description herein.

Even though particular combinations of features are disclosed in the specification, these combinations are not intended to limit the disclosure of possible implementations. In fact, many of these features may be combined in ways not specifically disclosed in the specification.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Systems, methods, and apparatuses provided in the example embodiments of the present disclosure address the shortcomings of the related art in managing location information of a mobile device.

Specifically, example embodiments of the present disclosure provide a location information management (LIM) system which automatically manages location information of one or more mobile devices. The LIM system may be operated by a trusted entity, such as a network operator. Further, the location information of the one or more mobile devices may be collected by the LIM system via available or existing network architecture and network infrastructure.

According to embodiments, the LIM system may interoperate with one or more components of a radio access network (RAN) and one or more components of a core network to manage the location information of the one or more mobile devices. In addition, the LIM system may continuously (or periodically) determine when and which mobile device(s) the associated location information should be managed, and may automatically perform one or more associated operations thereafter.

According to embodiments, the LIM system may continuously (or periodically) determine when and which mobile device(s) the associated location information should be acquired, obtained, or updated, and may automatically perform one or more operations for obtaining or acquiring the location information of the mobile device(s). The location information may include information of the real-time or near real-time location of the mobile device(s), information of the last known location of the mobile device(s), and/or information of the initial location of the mobile device(s).

According to embodiments, the LIM system may continuously (or periodically) determine when and which mobile device(s) the associated location information should be utilized, and may automatically perform one or more operations for utilizing the location information. For instance, the LIM system may interface between the target mobile device(s) and LBS system(s) of the associated service provider(s), may provide the location information of the target mobile device(s) to the LBS system(s) when required, and may receive the LBS and/or the associated information from the LBS system(s) and then provide the LBS and/or the associated information to the target mobile device(s). In this way, the provision of location information of the mobile device(s) to the LBS system(s) may be managed by the LIM system, instead of directly performed on target mobile device(s) via client application(s) installed in the target mobile device(s) as in the related art.

In view of the above, example embodiments of the present disclosure may manage the location information of the one or more mobile devices in a more secure manner, and the one or more mobile devices do not need to provide direct access to the service provider and/or to install additional software application for obtaining the location information.

In addition, execution of client application and/or GPS module on the one or more mobile devices are no longer required for obtaining location information of the one or more mobile devices. Accordingly, the location information of the one or more mobile devices may be obtained without internet connection (or with poor internet connection), and the power consumption of the mobile device for obtaining the location information may be reduced.

It is contemplated that features, advantages, and significances of example embodiments described herein are merely a portion of the present disclosure, and are not intended to be exhaustive or to limit the scope of the present disclosure.

Further descriptions of the features, components, configuration, operations, and implementations of the example embodiments of the present disclosure are provided in the following.

Example System Architecture

Figure 1:
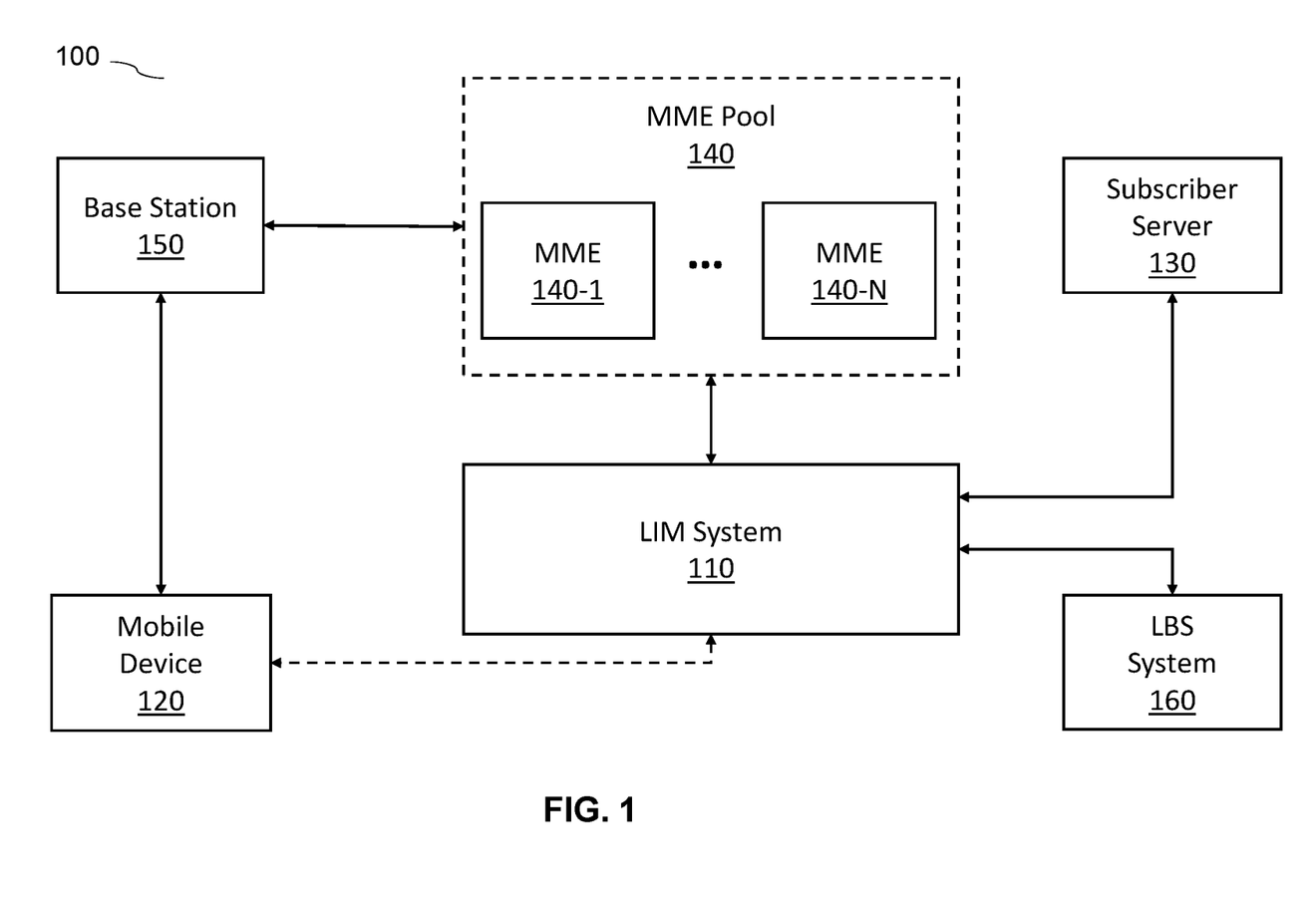
FIG. 1 illustrates a block diagram of an example system configuration for managing location information of one or more mobile devices, according to one or more embodiments.

FIG. 1 illustrates a block diagram of an example system or configuration 100 for managing location information of one or more mobile devices, according to one or more embodiments. As illustrated in FIG. 1, system 100 may include a location information management (LIM) system 110, at least one mobile device 120, at least one subscriber server 130, a mobility management entity (MME) pool 140 including a plurality of MMEs 140-1 to 140-N, at least one base station 150, and a location-based service (LBS) system 160.

Merely for descriptive purpose, it may be assumed in the following that the mobile device 120 is the mobile device of which the LIM system 110 may perform one or more operations for managing the location information (may be referred to as "target mobile device" herein). Further, it may be assumed that the base station 150 is the base station to which the target mobile device is communicating or is the base station which last serve the target mobile device 120 (may be referred to as "target base station" herein), and the MME 1401-1 is the MME which last serve the target mobile device 120 (may be referred to as "target MME" herein). It can be understood that, in practical, the system configuration may be different from as illustrated or as described, without departing from the scope of the present disclosure.

In general, the LIM system 110 may be configured to obtain information of the target MME 140-1 from the subscriber server 130, and to communicate with the target MME 140-1 to request for location information of the target mobile device 120. Accordingly, the target MME 140-1 may communicate with the target base station 150 to obtain the requested location information and may provide the location information to the LIM system 110. Next, the LIM system 110 may perform one or more actions or operations to manage the obtained location information.

According to embodiments, the LIM system 110 may be associated with a trusted entity. For instance, the LIM system 110 may be managed, operated, or the like, by a network operator. The LIM system 110 may include at least one gateway mobile location centre (GMLC). Alternatively or additionally, the LIM system 110 may include a business support system (BSS). The LIM system 110 may contains components, modules and functionalities to support management of location information of one or more mobile devices (e.g., target mobile device 120, etc.), and to interoperate with one or more LBS systems (e.g., LBS system 160). Further descriptions of the example components of LIM system 110 are provided below with reference to FIG. 2, and descriptions of several example operations performable by the LIM system 110 are provided below with reference to FIG. 3 to FIG. 5.

The mobile device 120 may include an equipment or a terminal with which a user utilized for using at least one LBS. For instance, the mobile device 120 may include a computing device (e.g., a desktop computer, a laptop computer, a tablet computer, a handheld computer, a smart speaker, a server, personal digital assistants (PDAs), etc.), a mobile phone (e.g., a smart phone, a radiotelephone, etc.), a wearable device (e.g., a pair of smart glasses, a smart watch, etc.), a roaming device, such as a network-connected roaming device; a wireless device such as a wireless email device or other device capable of communicating wireless with a computer network; a mobile station; or a similar device. According to embodiments, the mobile device 120 may include at least one subscriber identity module (SIM), such as: a SIM card, a chip embedded SIM, an eSIM, or the like. The mobile device 120 may be associated with a user who has provided consent to the trusted entity managing the LIM system (e.g., the network operator, etc.) for managing (e.g., obtaining, utilizing, etc.) the location information of the mobile device.

The subscriber server 130 may include an equipment or a terminal which manages (e.g., stores, provides, etc.) information of one or more subscribers (e.g., users associated with the LIM system, users associated with the LBS, etc.). In this regard, it can be understood that the terms "subscriber" and "user" may be used interchangeable herein. Alternatively or additionally, the subscriber server 130 may manage routing information, such as information of MME associated with mobile devices of the subscribers.

According to embodiments, the subscriber server 130 may include at least one home subscriber server (HSS), and the communication between the subscriber server 130 and LIM system 110 may be performed via a SLh interface. Alternatively or additionally, the subscriber server 130 may include any other type of server or database which may be utilized for storing and for providing information associated with the subscriber, such as a home location register (HLR), or the like.

The MME pool 140 may include a plurality of MMEs 140-1 to 140-N. Each of the MMEs may communicatively interact with one another. According to embodiments, each of the MMEs may be configured to manage sessions, authentication, paging, mobility, bearers, and connection among mobile device(s) and the associated base station(s). For instance, MME 140-1 may be configured to manage authentication and authorization of the mobile device 120 when the mobile device 120 first attaching to the network. In addition, the MME 140-1 may also be configured to manage communication of the mobile device 120 and the subscriber server 130 to provide reach-ability and activity-related information. Further, the MME 140-1 may also be configured to manage the information of the base station 150 to which the mobile device 120 is communicatively coupled. According to embodiments, each of the MMEs in the MME pool 140 may be communicatively coupled to a plurality of base stations, such that no change of MME is required whenever the mobile device 120 moves around among the plurality of base stations. According to embodiments, the communication between the MME pool 140 (or the MME 140-1 included therein) and the LIM system 110 may be performed via a SLg interface.

The base station 150 may include an equipment or a terminal which may be configured to transmit and to receive signals or data from the mobile device 120 to communicatively couple the mobile device 120 to the network. According to embodiments, the base station 150 may provide one or more of the following operations: radio resource management (RRM), data packet routing and forwarding, quality of service (QOS) management, and the like. The base station 150 may include, for example, a 4G eNodeB, a 5G gNodeB, a Wi-Fi access point, and the like.

The LBS system 160 may include an equipment or a terminal which may be utilized by one or more service providers to provide one or more LBS to the associated users or subscribers. According to embodiments, the LBS system 160 may include at least one server with at least one server application deployed thereto, wherein the server application may be configured to communicate with a client application (e.g., deployed in the mobile device 120, deployed in the LIM system 110, etc.) to provide LBS and/or the associated information via the client application.

Figure 2:
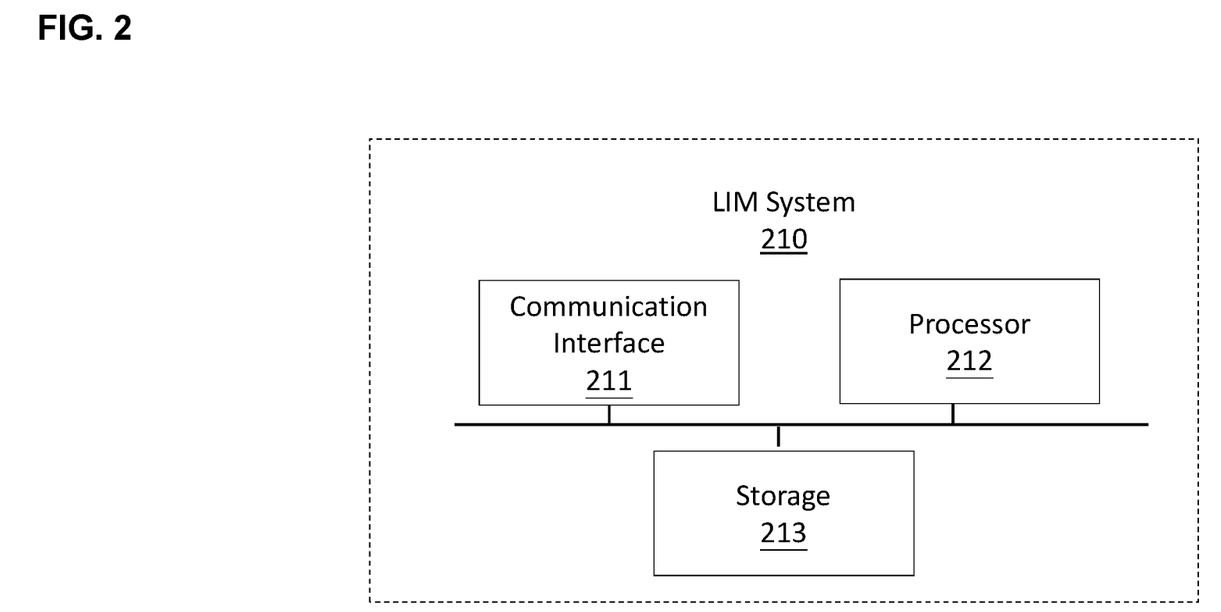
FIG. 2 illustrates a block diagram of example components of a location information management (LIM) system, according to one or more embodiments.

Referring next to FIG. 2, which illustrates a block diagram of example components of a LIM system 210, according to one or more embodiments. The LIM system 210 may correspond to the LIM system 110 in FIG. 1. As illustrated in FIG. 2, the LIM system 210 may include at least one communication interface 211, at least one processor 212, and at least storage 213. It can be understood that the LIM system 210 may include more or less components from as illustrated, may be arranged in a configuration different from as illustrated, or the like, without departing from the scope of the present disclosure.

The communication interface 211 may include at least one transceiver-like component (e.g., a transceiver, a separate receiver and transmitter, a bus, etc.) that enables the components of LIM system 210 to communicate with each other and to communicate with one or more components external to the LIM system 210, such as via a wired connection, a wireless connection, or a combination of wired and wireless connections.

For instance, the communication interface 211 may couple the processor 212 to the storage 213 to thereby enable them to communicate and to interoperate with each other in performing one or more operations. As another example, communication interface 211 may couple the LIM system 210 (or one or more components included therein) to a LBS system (e.g., LBS system 160), to a mobile device (e.g., mobile device 120), or the like, so as to enable them to communicate and to interoperate with each other.

According to embodiments, the communication interface 211 may include at least one software-based component, such as at least one application programming interface (API) which allows the LIM system 210 (or one or more components included therein) to communicate with one or more computer software or one or more application programs (e.g., server application deployed in the LBS system 160, etc.).

The processor 212 may include at least one processor capable of being programmed to perform a function(s) or an operation(s) described herein. For instance, the processor 212 may be configured to execute computer-readable instructions stored in at least one storage medium (e.g., storage 213, etc.) to thereby perform one or more actions or one or more operations described herein.

According to embodiments, the processor 212 may be configured to receive (e.g., via the communication interface 211, etc.) one or more signals defining one or more instructions for performing one or more operations. Further, the processor 212 may be implemented in hardware, firmware, or a combination of hardware and software. For instance, processor 212 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), and/or another type of processing or computing component.

According to embodiments, the processor 212 may be configured to collect, extract, obtain, and/or receive one or more information from a subscriber server (e.g., the subscriber server 130), from a MME (e.g., the MME 140-1), and/or from a LBS system (e.g., the LBS system 160), and to perform one or more actions or one or more operations for thereafter. According to embodiments, the processor 212 may act as a monitoring node which continuously (or periodically) monitors one or more configuration profiles, determines one or more target mobile devices based on the monitoring, and performs one or more actions to manage location information of the one or more target mobile devices. Descriptions of several example actions performable by the processor 212 are provided below with reference to FIG. 3 to FIG. 5, and descriptions of an example configuration profile are provided below with reference to FIG. 6.

The storage 213 may include one or more storage mediums suitable for storing data, information, and/or computer-readable or computer-executable instructions therein. According to embodiments, the storage 213 may include a random access memory (RAM), a read only memory (ROM), and/or another type of dynamic or static storage device (e.g., a flash memory, a magnetic memory, and/or an optical memory) that stores information and/or instructions for use by the processor 212. Additionally or alternatively, the storage 213 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

According to embodiments, the storage 213 may be configured to store information (e.g., raw data, metadata, etc.) obtained by the processor 212 from, for example, one or more of the subscriber server (e.g., the subscriber server 130), the MME (e.g., the MME 140-1), the LBS system (e.g., the LBS system 160), and the like. Additionally or alternatively, the storage 213 may be configured to store one or more information processed by or outputted by the processor 212. In some implementation, the storage 213 may include a plurality of storage mediums located at different locations, and the storage 213 may be configured to store a duplicate or a copy of at least a portion of the information in the plurality of storage mediums, for providing redundancy and for backing-up the information or the associated data.

According to embodiments, the storage 213 may store one or more configuration profiles and provide the same to the processor 212 for processing when required. Furthermore, the storage 213 may also store computer-readable instructions which, when being executed by one or more processors (e.g., processor 212), causes the one or more processors to perform one or more actions/operations described herein.

General Operations

Figure 3:
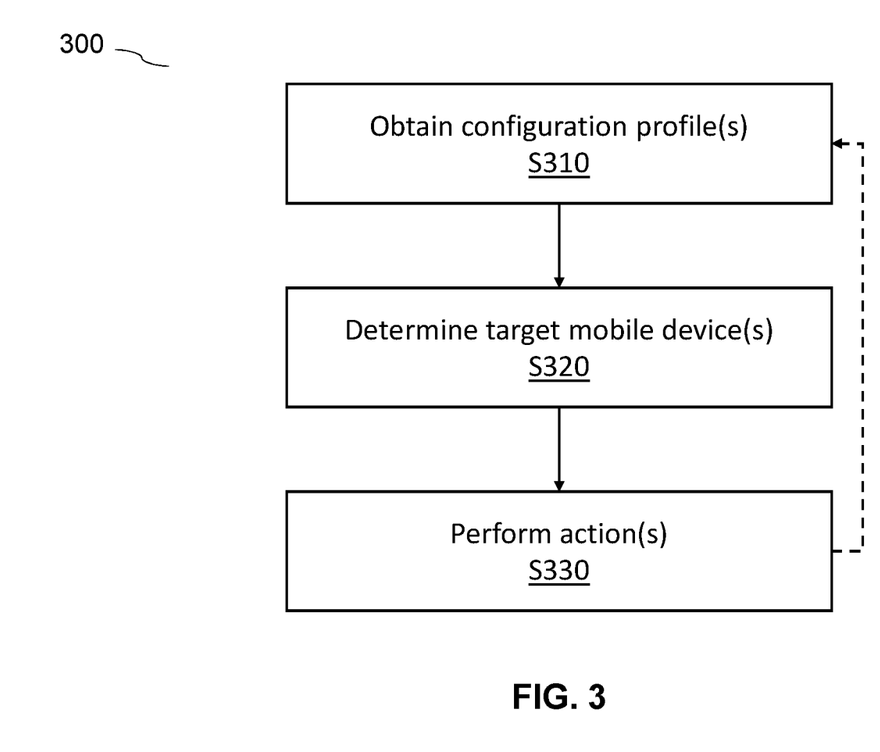
FIG. 3 illustrates a flow diagram of an example method for managing location information of one or more mobile devices, according to one or more embodiments.

FIG. 3 illustrates a flow diagram of an example method 300 for managing location information of one or more mobile devices, according to one or more embodiments. One or more operations in method 300 may be performed by at least one processor when the at least one processor is configured to execute computer-executable instructions stored in at least one memory storage. For instance, one or more operations in method 300 may be performed by the processor 212 of the LIM system 210 when the processor 212 is configured to execute instructions stored in the storage 213.

In general, the processor 212 may be configured to continuously (or periodically) obtain at least one configuration profile, to continuously (or periodically) determine at least one target mobile device based on the configuration profile, and to continuously (or periodically) perform at least one action or operation to manage location information of the at least one mobile device. Detail descriptions associated therewith are provided as follow.

Referring to FIG. 3, at operation S310, the processor 212 may be configured to obtain one or more configuration profiles. For instance, the processor 212 may continuously (or periodically) obtain the one or more configuration profiles from one or more storage mediums (e.g., storage 213). The one or more configuration profiles may include information such as an ID of a user or a subscriber (e.g., subscriber of a network, subscriber of a LBS, etc.), information of the mobile device of the user, schedule information, historical information, location information, or the like. Descriptions of an example configuration profile are provided below with reference to FIG. 6.

At operation S320, the processor 212 may be configured to determine one or more target mobile devices based on the one or more configuration profiles. For instance, the processor 212 may, based on the one or more configuration profiles, determine which mobile device(s) of which user(s)/subscriber(s) require which action(s) to be performed for managing the associated location information.

According to embodiments, the processor 212 may, based on the one or more configuration profiles, determine one or more target mobile devices of which the location information (e.g., current location, last know location, initial location, etc.) need to be acquired or be obtained. According to embodiments, the processor 212 may, based on the one or more configuration profiles, determine one or more target mobile device of which the location information need to be utilized.

At operation S330, the processor 212 may be configured to perform one or more actions for managing location information of the one or more target mobile devices. For instance, the processor 212 may perform one or more actions or operations for acquiring or for obtaining location information of the one or more target mobile devices (descriptions of associated example operations are provided below with reference to FIG. 4). As another example, the processor may perform one or more actions for utilizing the obtained location information (descriptions of associated example operations are provided below with reference to FIG. 5).

According to embodiments, upon performing operation S330, method 300 may return to operation S310, such that the processor 212 may repeatedly or iteratively perform one or more operations of method 300 for at least a predetermined period of time, so as to continuously (or periodically) perform method 300 for managing location information of one or more target mobile devices. For instance, the processor 212 may obtain a latest version of the one or more configuration profiles every 30 minutes, and may determine one or more target mobile devices and may perform the one or more actions for managing the location information associated therewith, based on the latest version of the one or more configuration profiles.

In view of the above, the LIM system 210 (or the processor 212 associated therewith) may automatically monitor configuration profile(s), may automatically determine the target mobile device(s) and the required action(s) for managing the associated location information, and may automatically perform the required action(s) thereafter.

Example Operation: Acquiring Location Information of Target Mobile Device.

Figure 4:
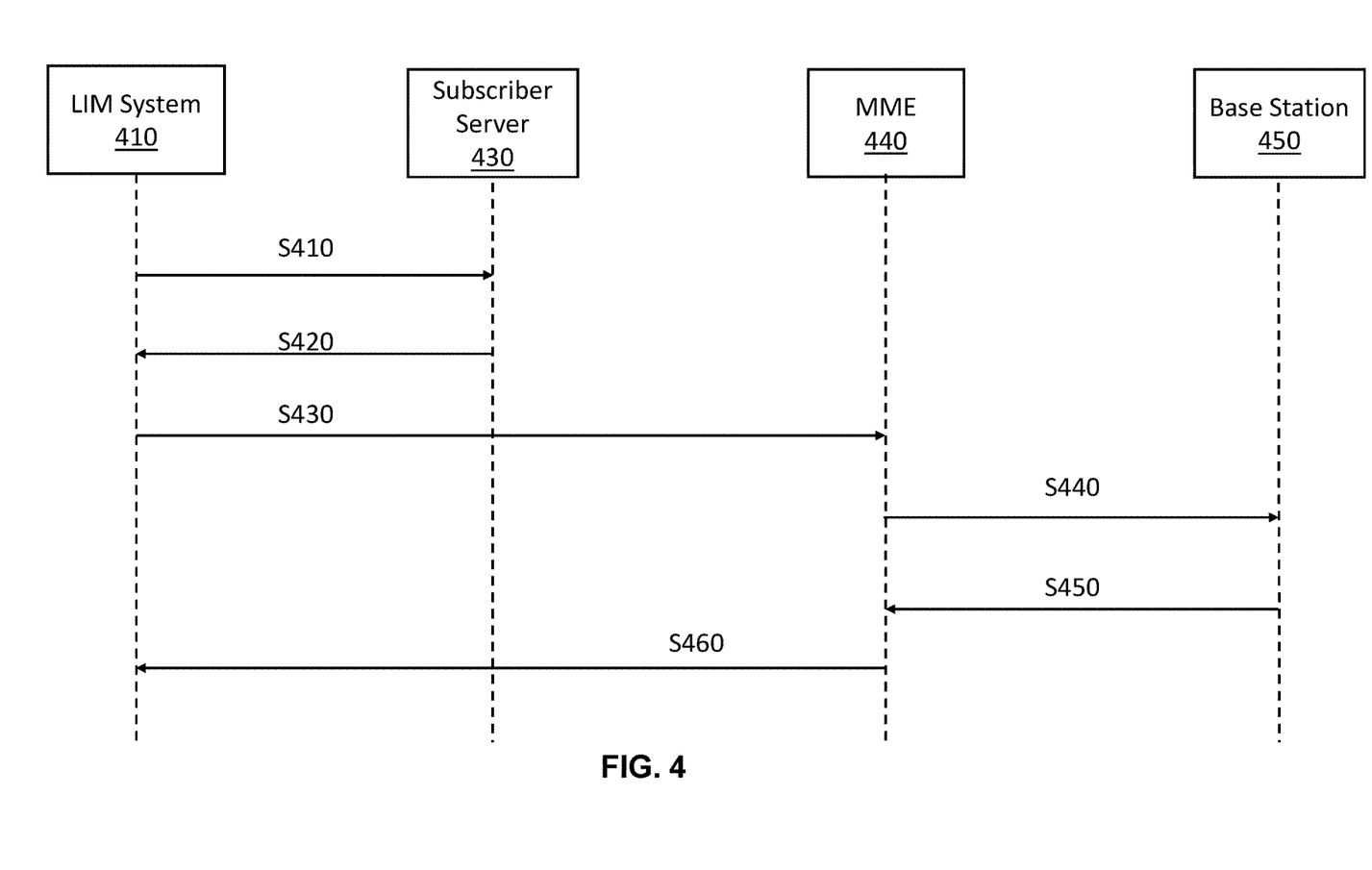
FIG. 4 illustrates a flow diagram of example operations for acquiring location information of one or more target mobile devices, according to one or more embodiments.

FIG. 4 illustrates a flow diagram of example operations for acquiring or for obtaining location information of one or more target mobile devices, according to one or more embodiments. One or more operations in FIG. 4 may be part of operation S330 of method 300.

The LIM system 410 may correspond to LIM system 110 in FIG. 1 and LIM system 210 in FIG. 2 and may include at least one processor (e.g., processor 212) in a similar manner as described hereinabove, the subscriber server 430 may correspond to the subscriber server 130 in FIG. 1, the MME 440 may correspond to the target MME 140-1 in the MME pool 140 in FIG. 1, and the base station 450 may correspond to the target base station 150 in FIG. 1.

According to embodiments, one or more operations in FIG. 4 may be automatically initiated or performed (e.g., continuously, periodically, etc.) by the processor of the LIM system 410, based on one or more associated configuration profiles. By way of example, one or more operations in FIG. 4 may be initiated by the processor of the LIM system 410 every 5 minutes for obtaining location information of a first target mobile device, may be initiated by the processor of the LIM system 410 every 1 hour for obtaining location information of a second target mobile device, or the like. Further, one or more operations in FIG. 4 may be initiated by the processor of the LIM system 410 to concurrently obtain location information of multiple target mobile devices.

In general, the LIM system 410, or the processor associated therewith (may be referred to as "the processor 212" hereinbelow for conciseness) may be configured to obtain, from the subscriber server 430, information of a target Mobility Management Entity (MME) associated with at least one target mobile device (e.g., MME 440), and to obtain, from the target MME, location information of the at least one target mobile device. Detail descriptions associated therewith are provided as follow.

Referring to FIG. 4, at operation S410, the LIM system 410 (or the processor 212) may initiate communication with the subscriber server 430 for obtaining information therefrom. For instance, the processor 212 may communicate with the subscriber server 430 to obtain information of the target MME 440 which has most recently served the target mobile device(s).

According to embodiments, the LIM system 410 (or the processor 212) may send a request for routing information (e.g., information on how to route the location request to the appropriate MME) to the subscriber server 430. The request may include information of the target mobile device(s), such as mobile station international subscriber directory number (MSISDN) associated with the target mobile device(s), international mobile subscriber identity (IMSI) associated with the target mobile device(s), and/or any other suitable information associated with the target mobile device(s). According to embodiments in which the LIM system 410 includes a GMLC, the request may further include information of the GMLC, such as GMLC ID/number, Integrated Services Digital Network (ISDN) number of the GMLC, or the like.

Upon receiving the request, at operation S420, the subscriber server 430 may perform, based on the request, one or more of the following: authorizing and authenticating the LIM system 410 (to ensure that the LIM system 410 belongs to a network authorized to obtain the requested information, etc.), determining whether or not information of the target mobile device(s) for which the information is requested exist in the subscriber server 430, and determining whether or not there is any MME associated with the target mobile device(s). Based on determining that there is an error in any of the above procedures, the subscriber server 430 may return an error message specifying the respective procedure and the reason of error at operation S420.

Otherwise, the subscriber server 430 may retrieve the requested information and may return the same to the LIM system 410 at operation S420. The information provided by the subscriber server 430 may include result of the request made by the LIM system 410 (e.g., request successful, etc.), information of the target mobile device(s) (e.g., MSISDN, IMSI, etc.), information of the target MME (e.g., name, number, ID, supported LBS, IP address, etc.), and/or the like.

Assuming that the LIM system 410 (or the processor 212) successfully obtains information of the target MME at operation S420, the LIM system 410 (or the processor 212) may initiate (based on the information of the target MME) communication with the target MME 440 for obtaining location information of the target mobile device(s) at operation S430.

According to embodiments, the LIM system 410 (or the processor 212) may send a request for location information of the target mobile device(s) to the target MME 440. The request may include information of the target mobile device(s), such as MSISDN associated with the target mobile device(s), IMSI associated with the target mobile device(s), and/or any other suitable information associated with the target mobile device(s). In addition, the request may include specification of the requested location information, such as type of location (e.g., current location, last known location, initial location, etc.), type of information (e.g., coordinate, radius, angle value, etc.), or the like. Additionally, the request may include information of the LIM system 410, such as the name/ID of the LIM system 410, type of the entity managing LIM system 410 (e.g., emergency, lawful interception, etc.), quality of service (QOS) requested (e.g., accuracy of positioning measurement, response time, etc.), and/or the like. According to embodiments in which the LIM system 410 includes a GMLC, the request may further include information of the GMLC, such as GMLC ID/number, ISDN number of the GMLC, or the like.

In some implementations, the request may include a request for multiple types of location, each of which is associated with a respective priority level. For instance, the request may include a request for a first type of location (e.g., current location) and a second type of location (e.g., last known location), wherein the first type of location has a first priority level (e.g., higher priority, etc.) and the second type of location has a second priority level (e.g., lower priority, etc.), or the like.

Upon receiving the request, at operation S440, the target MME 440 may determine (based on the information included in the request such as information of the target mobile device(s), etc.) the target base station 450 associated with the target mobile device(s) and to obtain the location information of the target mobile device(s) therefrom.

According to embodiments which the request includes a request for multiple types of location, the target MME 440 may determine the target base station and obtain the location information based on the priority level associated with each of the requested location. For instance, assuming that the request includes a request for current location of the target mobile device(s) with a first priority level (e.g., higher priority) and for last known location of the target mobile device(s) with a second priority level (e.g., lower priority), the target MME 440 may first determine whether or not a base station currently serving the target mobile device(s) can be found, and to obtain the current location of the target mobile device(s) from said base station (if any). In this regard, based on determining that the base station currently serving the target mobile device(s) cannot be found, or the current location of the target mobile device(s) cannot be obtained from said base station, the target MME 440 may determine a base station which has most recently served the target mobile device(s) and obtain the last known location of the target mobile device(s) from said base station thereafter.

Assuming that no base station is available for providing the requested location information, the target MME 440 may send a failure or error message to the LIM system 410 at operation S460. Otherwise, if the target base station 450 is available for providing the requested location information, the target MME 440 may initiate a communication with the target base station 450 and send a request for the location information thereto at operation S440. The request may include the information of the target mobile device(s) (e.g., MSISDN, IMSI, etc.), type of location (e.g., current location, last known location, initial location, etc.), type of information (e.g., coordinate, radius, angle value, etc.), and/or the like.

At operation S450, the target base station 450 may obtain, based on the request provided by the target MME 440, the requested location information, and may provide the requested location information to the target MME 440 thereafter. For instance, the target base station 450 may obtain the requested type(s) of location and requested type(s) of information for the requested target mobile device(s). The location of the target mobile device(s) may be obtained by the base station 450 via any suitable technologies or approaches, such as triangulation with other base station(s) nearby the target mobile device(s), signal quality analysis, and/or the like.

Accordingly, at operation S460, the target MME 440 may provide the location information of the target mobile device(s) to the LIM system 410, and the LIM system 410 (or the processor 212) may receive (via the communication interface 211, etc.) the location information of the target mobile device(s) from the target MME 440.

In view of the above, operations S410-S420 may be collectively considered as an operation at which the LIM system 410 (or the processor 212) obtain information of a target MME associated with the target mobile device(s), and operations S430-S460 may be collectively considered as an operation at which the LIM system 410 (or the processor 212) obtain the location information of the target mobile device(s) from the target MME.

According to embodiments, the communication among the LIM system 410 (or the processor 212) and the subscriber server 430 may be performed via a Diameter-based SLh interface, the communication among the LIM system 410 (or the processor 212) and the target MME 440 may be performed via a SLg interface, and the communication among the target MME 440 and the target base station 450 may be performed via a S1-MME interface.

Upon obtaining the location information of the target mobile device(s), the LIM system 410 (or the processor 212) may be configured to store, to process and/or to utilize said location information. For instance, LIM system 410 (or the processor 212) may store the obtained location information (e.g., update location information of a configuration profile as illustrated in FIG. 6, etc.), may utilize the location information (e.g., as illustrated in FIG. 5), and/or the like.

To this end, the LIM system 410 (or the processor 212) may obtain (continuously, periodically, etc.) location information of the target mobile device(s) from the available or existing network architecture, such as components of a RAN (e.g., MME, base station, etc.), without requiring the target mobile device(s) to turn-on the internet connection, GPS module, and/or the client application associated with the LBS as in the related art.

Example Operation: Utilizing Location Information

Figure 5:
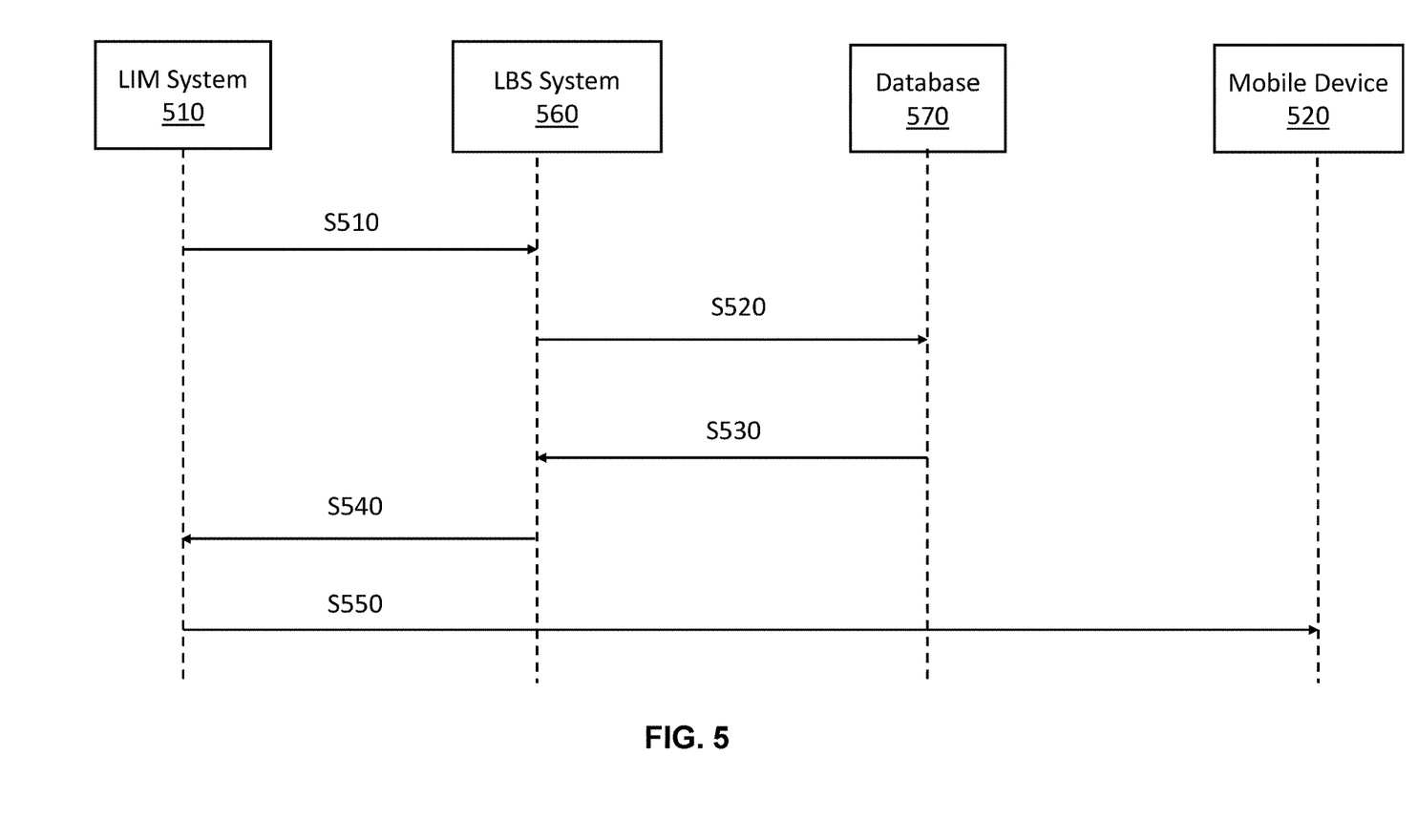
FIG. 5 illustrates a flow diagram of example operations for utilizing location information of one or more target mobile devices, according to one or more embodiments.
Figure 6:
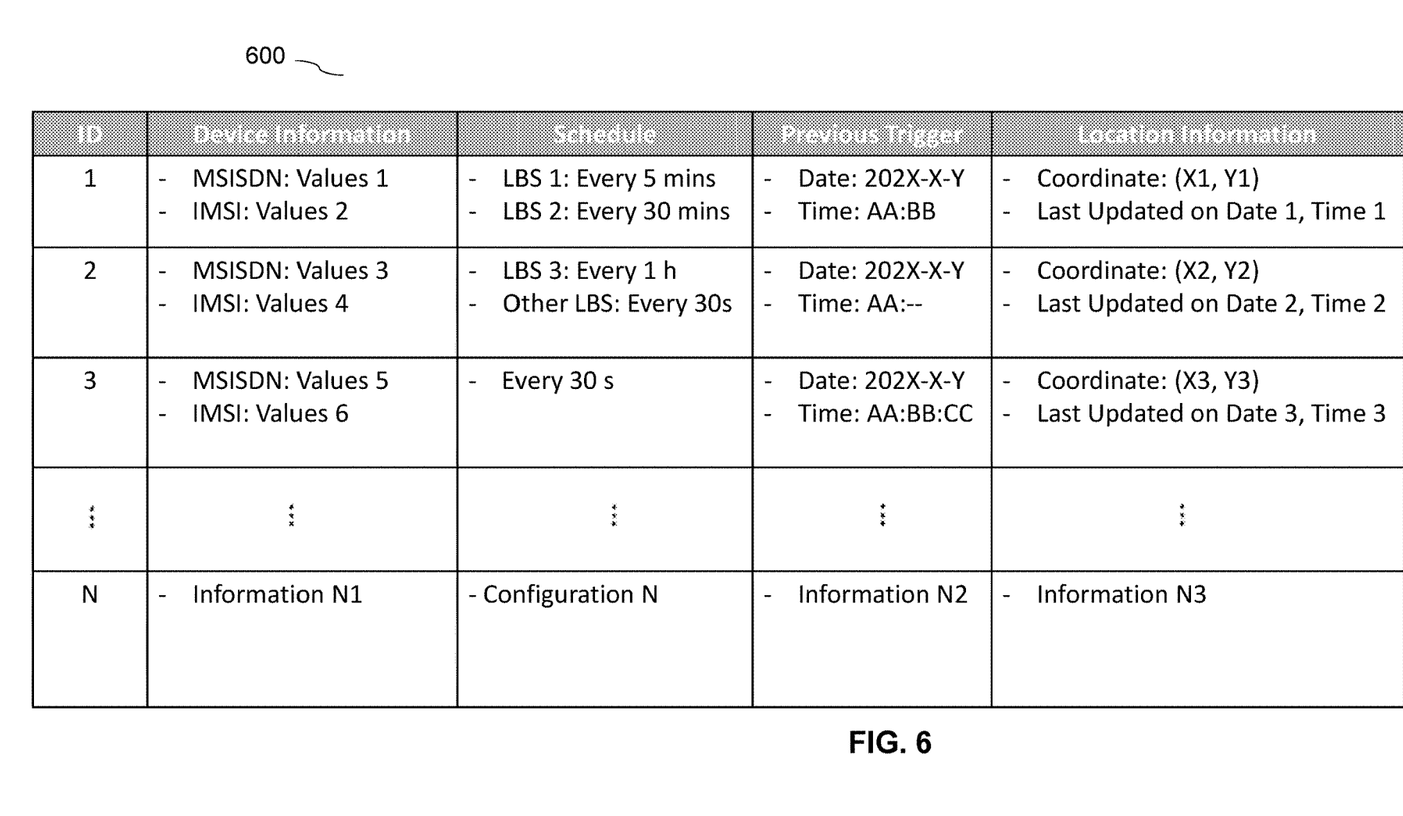
FIG. 6 illustrates an example configuration profile, according to one or more embodiments.

FIG. 5 illustrates a flow diagram of example operations for utilizing location information of one or more target mobile devices, according to one or more embodiments. One or more operations in FIG. 5 may be part of operation S330 of method 300.

According to embodiments, one or more operations in FIG. 5 may be performed subsequent to operation S460 in FIG. 4, for utilizing the location information obtained via the operations in FIG. 4. Alternatively, one or more operations in FIG. 5 may be performed whenever the LIM system 510 determine that said operation(s) is required.

The LIM system 510 may correspond to LIM system 110 in FIG. 1, LIM system 210 in FIG. 2, and LIM system 410 in FIG. 4 and may include at least one processor (e.g., processor 212) in a similar manner as described hereinabove, the LBS system 560 may correspond to the LBS system 160 in FIG. 1, and the mobile device 520 may correspond to the target mobile device 120 in FIG. 1. The database 570 may be a database associated with LBS system 560, such as a database for storing LBS information, for deploying LBS application, and the like. It can be understood that, in some implementations, the database 570 may be included in the LBS system 560, without departing from the scope of the present disclosure.

According to embodiments, one or more operations in FIG. 5 may be automatically initiated or performed (e.g., continuously, periodically, etc.) by the processor of the LIM system 510, based on one or more associated configuration profiles. By way of example, one or more operations in FIG. 5 may be initiated by the processor of the LIM system 510 every 5 minutes for utilizing location information of a first target mobile device, may be initiated by the processor of the LIM system 510 every 1 hour for utilizing location information of a second target mobile device, or the like. Further, one or more operations in FIG. 5 may be initiated to concurrently utilize location information of multiple target mobile devices.

In general, the LIM system 510, or the processor associated therewith (may be referred to as "the processor 212" hereinbelow for conciseness) may be configured to determine, based on one or more configuration profiles (e.g., configuration profile(s) obtained at operation S310, etc.), a location-based service (LBS) associated with at least one target mobile device (e.g., the target mobile device 520); to provide, to a system associated with the LBS (e.g., the LBS system 560), a request for the LBS, wherein the request comprises the location information of the at least one target mobile device; to receive, from the system associated with the LBS, information associated with the LBS; and to provide, to the at least one target mobile device, the information associated with the LBS. Detail descriptions associated therewith are provided as follows.

Referring to FIG. 5, at operation S510, the LIM system 510 (or the processor 212) may initiate communication with the LBS system 560 for utilizing the location information. For instance, the LIM system 510 (or the processor 212) may determine (e.g., based on one or more configuration profiles) which LBS is required for which target mobile device(s), and may provide a request for the LBS and/or for the associated information to the LBS system 560 (i.e., system associated with the LBS).

According to embodiments, the request may include the location information of the target mobile device(s), information of the requested LBS, and information of the target mobile device(s)(e.g., MSISDN, etc.). In some implementation, instead of including the actual information of the target mobile device(s) (e.g., MSISDN, etc.) in the request, the LIM system 510 (or the processor 212) may assign a temporary and/or virtual ID representing the target mobile device(s) and include the temporary and/or virtual ID in the request. In this way, the LBS system 560 may be able to provide the LBS based on the location information and the temporary and/or virtual ID, without knowing the detail information of the target mobile device(s).

At operation S520, the LBS system 560 may, based on the request provided by the LIM system 510 (or the processor 212), retrieve the LBS and/or the associated information from the database 570. For instance, the LBS system 560 may authenticate and authorize the request to ensure that the request is provided by a valid entity. Subsequently, the LBS system 560 validate the location information included in the request (e.g., to ensure that the LBS is available at the location defined in the location information, etc.). Based on determining that the LBS is valid at the location, at operation S520, the LBS system 560 may communicate with the database 570 to obtain the LBS and/or the associated information most related to the location. Otherwise, at operation S540, the LBS system 560 may provide to the LIM system 510 (or the processor 212) an error message or a message indicating that no available LBS is available.

Accordingly, at operation S530, the database 570 may provide the requested LBS and/or the associated information to the LBS system 560, and the LBS system 560 may provide the same to the LIM system 510 at operation S540.

Subsequently, at operation S550, the LIM system 510 (or the processor 212) may provide the LBS and/or the associated information to the target mobile device 520. For instance, the LBS and/or the associated information may be provided to the target mobile device 520 via any suitable channel, such as via Short Message Service (SMS) (e.g., application to person (A2P) SMS, web-based SMS, etc.), email, or the like.

By way of example, assuming that the LBS is a provision of location-based campaign information, the LIM system 510 is managed by a network operator and the LBS system 560 is managed by a campaign provider. In this case, the location information of the target mobile device(s) of the campaign provision service may be obtained by the LIM system 510 (via operations in FIG. 4, etc.), and the LIM system 510 may provide the location information (e.g., coordinate, location string, etc.) to the LBS system 560 (e.g., campaign management system, etc.) of the campaign provider. Accordingly, the LBS system 560 may retrieve appropriate campaign information (e.g., campaign information associated with shops, restaurants, etc., nearby the location of the target mobile device(s), etc.) from the database 570 and provide the same to the LIM system 510. Subsequently, the LIM system 510 may provide the campaign information to the target mobile device 520 (via SMS, via email, etc.).

It can be understood that the features and operations described hereinabove are merely examples and the scope of the present disclosure should not be limited thereto. Specifically, any other type of LBS may be provided, in a manner or a configuration different from those described herein, without departing from the scope of the present disclosure.

In view of the above, operation S510 may be considered as an operation at which the LIM system 510 (or the processor 212) determine at least one LBS associated with the target mobile device(s) and provide a request for the LBS to the LBS system, operations S520-540 may be collective considered as an operation at which the LIM system 510 (or the processor 212) receive the LBS and/or the information associated with the LBS from the LBS system, and operation S550 may be considered as an operation at which the LIM system 510 (or the processor 212) provide the LBS and/or the information associated with the LBS to the target mobile device(s).

To this end, the LIM system 510 (or the processor 212) may provide (continuously, periodically, etc.) the location information of the target mobile device(s) to the LBS system and may provide the LBS and/or the associated information to the target mobile device(s), without requiring the LBS system to directly access the target mobile device(s) as in the related art.

Example Configuration Profile

FIG. 6 illustrates an example configuration profile 600, according to one or more embodiments. As illustrated in FIG. 6, the configuration profile 600 may include information such as (but are not limited to): ID of multiple users/subscribers, device information, schedule information, historical information, location information, and/or the like.

In this regard, it can be understood that the users/subscribers are those who have provided consent to the trusted entity managing the LIM system (e.g., the network operators) and/or to the service provider for managing (e.g., obtaining, utilizing, etc.) the location information of their mobile device(s) for the associated LBS. Further, although FIG. 6 illustrates that a configuration profile may include information associated with multiple users or subscribers, it may be understood that each of the users/subscribers may have an independent configuration profile created therefor, without departing from the scope of the present disclosure.

Referring to FIG. 6, the ID of multiple users/subscribers may include ID of a user associated with the target mobile device(s). According to embodiments, the ID may include a virtual and/or temporary ID assigned by the LIM system (or the processor associated therewith) to each of the users/subscribers. In this regard, the ID may replace the actual user information (e.g., MSISDN, etc.) when utilizing the LBS.

The device information may include information of the target mobile device(s). According to embodiments, the device information may include MSISDN and IMSI of the associated mobile device. In some embodiments, one user/subscriber may possess more than one mobile device. In that case, the user/subscriber may have more than one MSISDN and IMSI recorded in the configuration profile. Further, it may be understood that the configuration profile may include any additional information associated with the mobile device of the user/subscriber, such as international mobile equipment identity (IMEI), or the like, without departing from the scope of the present disclosure.

The schedule information may include a time interval of which the location information should be obtained and/or the location information should be utilized (e.g., be provided to the service provider, etc.). As illustrated in FIG. 6, the schedule information may be configured as per LBS basis (e.g., location information of mobile device of user/subscriber 1 may be obtained/utilized every 5 minutes for LBS 1 and may be obtained/utilized every 30 minutes for LBS 2, etc.), may be configured for a specific LBS (e.g., location information of mobile device of user/subscriber 2 may be obtained/utilized every 1 hour for LBS 3 and may be obtained/utilized every 30 seconds for other purposes, etc.), may be configured in generic (location information of mobile device of user/subscriber 3 may be obtained/utilized every 30 seconds for all purposes, etc.), or the like. The schedule information may be configured/specified by the associated user/subscriber, may be provided by the service provider based on the requirement of the associated LBS, may be managed by the network operator as per requirement, and/or the like.

The historical information may include timing information of the most recently triggered action (e.g., obtaining location information, utilizing location information, etc.). For instance, as illustrated in FIG. 6, the historical information may include date information and time information of the most recently triggered action, although it may be understood that other suitable information (e.g., description of action, result of action, etc.) may also be included, without departing from the scope of the present disclosure.

The location information may include location information most recently obtained by the LIM system. As illustrated in FIG. 6, the location information may include coordinate of the mobile device of the respective user/subscriber, and the timing information at which the location information is last updated. It may be understood that any other suitable information (e.g., angle value, address, etc.) may also be included. Further, it is contemplated that the historical location information (e.g., from the initial location to the most recent location, etc.) may also be included, without departing from the scope of the present disclosure.

The configuration profile may be stored, utilized, or generated in any suitable computer-readable format, such as (but are not limited to) JavaScript Object Notation (JSON) format, Extensible Markup Language (XML) format, or the like. Further, although it is illustrated that the information of the configuration profile may be presented in table form, it can be understood that the information may be presented in any suitable form, without departing from the scope of the present disclosure.

Furthermore, the configuration profile may include any suitable additional information, such as information associated with the MME and/or base station the mobile device has connected to, information of the user/subscriber preferred method for receiving the LBS (e.g., via SMS, via email, via installed application, etc.), and/or the like.

In addition, a portion of the above described information may be stored in a file(s) or document(s) separated from the configuration profile. For example, the location information may be stored in a dedicated file(s) or document(s), in addition to or separated from the configuration profile, or the like.

In view of the above, the LIM system (or the processor associated therewith) may, based on the information included in the configuration profile, automatically and repeatedly perform one or more operations for managing location information of one or more target devices. By way of example, the LIM system (or the associated processor) may continuously (or periodically) obtain (from one or more storage mediums) the latest version of configuration profile 600, may continuously (or periodically) determine which of the mobile device(s) is the target mobile device(s) and which action(s) should be performed, or the like.

Various Aspects of Embodiments

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer readable media according to various embodiments. In this regard, each block in the flowcharts or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code-it being understood that software and hardware may be designed to implement the systems and/or methods based on the description herein.

Various further respective aspects and features of embodiments of the present disclosure may be defined by the following items:

Item [1]: A system including: a memory storage storing computer-executable instructions; and at least one processor communicatively coupled to the memory storage, wherein the at least one processor may be configured to execute the instructions to: obtain at least one configuration profile; determine, based on the at least one configuration profile, at least one target mobile device; and perform an action for managing location information of the at least one target mobile device.

Item [2]: The system according to item [1], wherein the at least one processor may be further configured to execute the instructions to repeatedly perform, for a predetermined period of time, the obtaining of the at least one configuration profile, the determining of the at least one target mobile devices, and the performing of the action.

Item [3]: The system according to any one of items [1]-[2], wherein the at least one processor may be configured to execute the instructions to perform the action by: obtaining location information of the at least one target mobile device.

Item [4]: The system according to any one of items [1]-[2], wherein the at least one processor may be configured to execute the instructions to perform the action by: utilizing the location information of the at least one target mobile device.

Item [5]: The system according to item [3], wherein the at least one processor may be configured to execute the instructions to obtain the location information of the at least one target mobile device by: obtaining, from a subscriber server, information of a target Mobility Management Entity (MME) associated with the at least one target mobile device; and obtaining, from the target MME, the location information of the at least one target mobile device.

Item [6]: The system according to item [4], wherein the at least one processor may be configured to execute the instructions to utilize the location information of the at least one target mobile device by: determining, based on the configuration profile, a location-based service (LBS) associated with the at least one target mobile device; providing, to a system associated with the LBS, a request for the LBS, wherein the request may include the location information of the at least one target mobile device; receiving, from the system associated with the LBS, information associated with the LBS; and providing, to the at least one target mobile device, the information associated with the LBS.

Item [7]: The system according to item [5], wherein the at least one processor may be configured to execute the instructions to obtain the location information of the at least one target mobile device from the target MME by: sending, to the target MME, a request for the location information, wherein the request may include a request for a first type of location having a first priority level and a second type of location having a second priority level.

Item [8]: The system according to any one of items [1]-[7], the at least one configuration profile may include: an ID of a user associated with the at least one target mobile device, information of the at least one target mobile device, schedule information, historical information, and location information.

Item [9]: The system according to item [8], wherein the ID may include a virtual ID.

Item [10]: A method, performed by at least one processor, including: obtaining at least one configuration profile; determining, based on the at least one configuration profile, at least one target mobile device; and performing an action for managing location information of the at least one target mobile device.

Item [11]: The method according to item [10], further including: repeatedly performing, for a predetermined period of time, the obtaining of the at least one configuration profile, the determining of the at least one target mobile devices, and the performing of the action.

Item [12]: The method according to any one of items [10]-[11], wherein the performing the action may include: obtaining location information of the at least one target mobile device.

Item [13]: The method according to any one of items [10]-[11], wherein the performing the action may include: utilizing the location information of the at least one target mobile device.

Item [14]: The method according to item [12], wherein the obtaining the location information of the at least one target mobile device may include: obtaining, from a subscriber server, information of a target Mobility Management Entity (MME) associated with the at least one target mobile device; and obtaining, from the target MME, the location information of the at least one target mobile device.

Item [15]: The method according to item [13], wherein the utilizing the location information of the at least one target mobile device may include: determining, based on the configuration profile, a location-based service (LBS) associated with the at least one target mobile device; providing, to a system associated with the LBS, a request for the LBS, wherein the request may include the location information of the at least one target mobile device; receiving, from the system associated with the LBS, information associated with the LBS; and providing, to the at least one target mobile device, the information associated with the LBS.

Item [16]: The method according to item [14], wherein the obtaining the location information of the at least one target mobile device from the target MME may include:

sending, to the target MME, a request for the location information, wherein the request may include a request for a first type of location having a first priority level and a second type of location having a second priority level.

Item [17]: The method according to any one of items [10]-[16], wherein the at least one configuration profile may include: an ID of a user associated with the at least one target mobile device, information of the at least one target mobile device, schedule information, historical information, and location information.

Item [18]: The method according to item [17], wherein the ID may include a virtual ID.

Item [19]: A non-transitory computer-readable recording medium having recorded thereon instructions executable by at least one processor to cause the at least one processor to perform a method including: obtaining at least one configuration profile; determining, based on the at least one configuration profile, at least one target mobile device; and performing an action for managing location information of the at least one target mobile device.

Item [20]: The non-transitory computer-readable recording medium according to item [19], wherein the method may further include: repeatedly performing, for a predetermined period of time, the obtaining of the at least one configuration profile, the determining of the at least one target mobile devices, and the performing of the action.

It can be understood that numerous modifications and variations of the present disclosure are possible in light of the above teachings. It will be apparent that within the scope of the appended clauses, the present disclosures may be practiced otherwise than as specifically described herein.

What is claimed is:

1. A system comprising:
   a memory storage storing computer-executable instructions; and
   at least one processor communicatively coupled to the memory storage, wherein the at least one processor is configured to execute the instructions to:
   obtain at least one configuration profile;
   determine, based on the at least one configuration profile, at least one target mobile device; and
   perform an action for managing location information of the at least one target mobile device,
   wherein the at least one processor is configured to execute the instructions to perform the action by: obtaining location information of the at least one target mobile device,
   wherein the at least one processor is configured to execute the instructions to obtain the location information of the at least one target mobile device by:
   obtaining, from a subscriber server, information of a target Mobility Management Entity (MME) associated with the at least one target mobile device; and
   obtaining, from the target MME, the location information of the at least one target mobile device, and
   wherein the at least one processor is configured to execute the instructions to obtain the location information of the at least one target mobile device from the target MME by:
   sending, to the target MME, a request for the location information, wherein the request comprises a request for a first type of location having a first priority level and a second type of location having a second priority level.

2. The system according to claim 1, wherein the at least one processor is further configured to execute the instructions to repeatedly perform, for a predetermined period of time, the obtaining of the at least one configuration profile, the determining of the at least one target mobile devices, and the performing of the action.

3. The system according to claim 1, wherein the at least one processor is configured to execute the instructions to perform the action by: utilizing the location information of the at least one target mobile device.

4. The system according to claim 3, wherein the at least one processor is configured to execute the instructions to utilize the location information of the at least one target mobile device by:
   determining, based on the configuration profile, a location-based service (LBS) associated with the at least one target mobile device;
   providing, to a system associated with the LBS, a request for the LBS, wherein the request comprises the location information of the at least one target mobile device;
   receiving, from the system associated with the LBS, information associated with the LBS; and
   providing, to the at least one target mobile device, the information associated with the LBS.

5. The system according to claim 1, wherein the at least one configuration profile comprises: an ID of a user associated with the at least one target mobile device, information of the at least one target mobile device, schedule information, historical information, and location information.

6. The system according to claim 5, wherein the ID comprises a virtual ID.

7. A method, performed by at least one processor, comprising:
   obtaining at least one configuration profile;
   determining, based on the at least one configuration profile, at least one target mobile device; and
   performing an action for managing location information of the at least one target mobile device
   wherein the performing the action comprises. obtaining location information of the at least one target mobile device,
   wherein the obtaining the location information of the at least one target mobile device comprises:
   obtaining, from a subscriber server, information of a target Mobility Management Entity (MMB) associated with the at least one target mobile device; and
   obtaining, from the target MME. the location information of the at least one target mobile device, and
   wherein the obtaining the location information of the at least one target mobile device from the target MME comprises:
   sending, to the target MME, a request for the location information, wherein the request comprises a request for a first type of location having a first priority level and a second type of location having a second priority level.

8. The method according to claim 7, further comprising: repeatedly performing, for a predetermined period of time, the obtaining of the at least one configuration profile, the determining of the at least one target mobile devices, and the performing of the action.

9. The method according to claim 7, wherein the performing the action comprises:
   utilizing the location information of the at least one target mobile device.

10. The method according to claim 9, wherein the utilizing the location information of the at least one target mobile device comprises:
    determining, based on the configuration profile, a location-based service (LBS) associated with the at least one target mobile device;
    providing, to a system associated with the LBS, a request for the LBS, wherein the request comprises the location information of the at least one target mobile device;
    receiving, from the system associated with the LBS, information associated with the LBS; and
    providing, to the at least one target mobile device, the information associated with the LBS.

11. The method according to claim 7, wherein the at least one configuration profile comprises: an ID of a user associated with the at least one target mobile device, information of the at least one target mobile device, schedule information, historical information, and location information.

12. The method according to claim 11, wherein the ID comprises a virtual ID.

13. A non-transitory computer-readable recording medium having recorded thereon instructions executable by at least one processor to cause the at least one processor to perform a method comprising:
    obtaining at least one configuration profile;
    determining, based on the at least one configuration profile, at least one target mobile device; and
    performing an action for managing location information of the at least one target mobile device,
    wherein the performing the action comprises: obtaining location information of the at least one target mobile device,
    wherein the obtaining the location information of the at least one target mobile device comprises:
        obtaining, from a subscriber server, information of a target Mobility Management Entity (MME) associated with the at least one target mobile device; and
        obtaining, from the target MME, the location information of the at least one target mobile device and
    wherein the obtaining the location information of the at least one target mobile device from the target MME comprises:
    sending to the target MME, a request for the location information, wherein the request comprises a request for a first type of location having a first priority level and a second type of location having a second priority level.

14. The non-transitory computer-readable recording medium according to claim 13, wherein the method further comprises: repeatedly performing, for a predetermined period of time, the obtaining of the at least one configuration profile, the determining of the at least one target mobile devices, and the performing of the action.

* * * * *